United States Patent [19]
Butts et al.

[11] Patent Number: 4,629,968
[45] Date of Patent: Dec. 16, 1986

[54] ALTERNATOR LOAD CONTROL SYSTEM

[75] Inventors: Kenneth R. Butts, Grosse Pointe Woods; Joseph L. Wanamaker, Rochester, both of Mich.

[73] Assignee: General Motors Corporation, Detroit, Mich.

[21] Appl. No.: 768,677

[22] Filed: Aug. 23, 1985

[51] Int. Cl.⁴ .............................................. H02P 9/10
[52] U.S. Cl. ...................................... 322/29; 322/28; 322/8; 320/62; 320/64
[58] Field of Search ...................... 320/62, 64, 61, 39, 320/40; 322/28, 36, 29; 361/18

[56] References Cited

U.S. PATENT DOCUMENTS

| | | | |
|---|---|---|---|
| 2,095,806 | 10/1935 | Frank | 290/40 |
| 2,150,294 | 12/1937 | Roosa et al. | 290/40 |
| 2,269,704 | 5/1940 | Berry | 123/102 |
| 2,434,182 | 7/1944 | Taplin | 290/40 |
| 3,499,164 | 5/1967 | Ferre et al. | 290/17 |
| 3,551,685 | 12/1970 | Corry | 290/14 |
| 3,597,654 | 8/1971 | Harland et al. | 317/13 B |
| 3,701,556 | 10/1972 | Richmond | 290/40 R |
| 4,015,187 | 3/1977 | Sasaki et al. | 322/14 |
| 4,271,402 | 6/1981 | Kastura et al. | 340/52 F |
| 4,297,978 | 11/1981 | Matsui | 123/339 |
| 4,308,492 | 12/1981 | Mori et al. | 320/32 |
| 4,323,837 | 4/1982 | Nakamura et al. | 322/7 |
| 4,337,742 | 7/1982 | Carlson et al. | 123/339 |
| 4,345,557 | 8/1982 | Ikeura | 123/339 |
| 4,393,319 | 7/1983 | Bock | 310/80 |
| 4,402,288 | 9/1983 | Ohgami et al. | 123/339 |
| 4,423,307 | 12/1983 | Kondo et al. | 219/202 |
| 4,424,477 | 1/1984 | Enoshima et al. | 320/61 |
| 4,459,489 | 7/1984 | Kirk et al. | 290/13 |
| 4,463,305 | 7/1984 | Wineland et al. | 322/10 |

Primary Examiner—Patrick R. Salce
Assistant Examiner—Mark D. Simpson
Attorney, Agent, or Firm—C. R. Meland

[57] ABSTRACT

A load control system for controlling the field current of an alternating current generator and the idle speed control system for the engine that drives the generator. A voltage regulator senses the output voltage of the generator and controls field current by causing a semiconductor switch connected in series with the field winding to switch on and off in accordance with the magnitude of the sensed voltage. The voltage regulator is controlled to operate in a conventional manner when engine speed is higher than engine idle speed. When engine speed is in an idle speed range the duty cycle or on time of the semiconductor is controlled such that consecutive occurring on times are gradually increased to gradually increase field current when the output voltage of the generator is below a desired regulated value. The system operates to actuate an engine idle speed control system to increase the amount of fuel-air mixture supplied to the engine when the on times of the semiconductor switch are being gradually increased. In the event that engine speed decreases by a predetermined amount when the engine is operating in the idle speed range the on time or duty cycle of the semiconductor switch is reduced to a minimum to prevent engine stall.

7 Claims, 4 Drawing Figures

ALTERNATOR LOAD CONTROL SYSTEM

This invention relates to an alternator load control and more particularly to a load control for controlling the field current of a diode-rectified alternating current generator that feeds the electrical loads on a motor vehicle and for controlling the idle speed control system for the motor vehicle engine that drives the alternating current generator.

In a conventional voltage regulating system for a diode-rectified alternating current generator that feeds the electrical loads on a motor vehicle, including the storage battery, the voltage regulator senses the voltage that is applied to the battery by a bridge rectifier. The purpose of the voltage regulator is to maintain the voltage applied to the battery at a predetermined desired regulated value, for example 14 volts in a 12 volt system. This is accomplished by providing a semiconductor switch that may take the form of a transistor that is connected in series with the field winding of the generator and causing the transistor to be biased conductive and nonconductive in accordance with sensed battery voltage to thereby energize and deenergize the field winding. When the voltage applied to the battery is higher than the desired regulated value, the transistor is biased nonconductive. When the voltage applied to the battery is below the desired regulated value, the transistor is biased conductive to thereby energize the field winding. When a large electrical load is applied to a system of the type that has been described, the output voltage of the generator may suddenly drop to a value where the voltage applied to the battery is below the desired regulated value and consequently the transistor is biased continuously conductive. With the transistor biased continuously conductive, full field voltage is applied which loads the generator and consequently the generator imposes a suddenly increasing load on the engine. As a result of this, the engine suddenly slows down which adversely effects the engine idle quality when the engine is operating in an idle speed range. Thus, even when the idle speed of the engine is controlled by an idle speed control system the idle speed control system will not react quickly enough to prevent a substantial drop in engine speed when a large electrical load is applied to the generator and, depending on the total load imposed on the engine, may cause the engine to stall.

The U.S. Pat. to Kirk et al. No. 4,459,489 recognizes the problem of the generator imposing a sudden torque load on the engine when a large electrical load is applied to the generator. In that patent the voltage regulator is controlled so as to gradually increase field current when a large electrical load is applied to the generator to thereby prevent the generator from imposing a suddenly increasing torque load on the generator at the time when the large electrical load is applied. The system of that patent senses the voltage applied to the battery and if this voltage suddenly drops, due to the connection of a large electrical load to the generator, the voltage regulator is placed in a mode of operation wherein field current is pulse-width modulated and is modulated such as to slowly increase field current.

The load control system of this invention differs from the system disclosed in the above-referenced Kirk et al. patent in that it controls both field current and the idle speed control system of the engine that drives the generator. Thus, when the control system of this invention is operating in a load response mode it controls field current so as to gradually increase it when a large electrical load is applied to the generator and it also operates the idle speed control system for the engine that drives the generator to increase the fuel-air mixture supplied to the engine. The control system of this invention operates such that when a large electrical load is applied to the generator the system senses a drop in generator output voltage and then operates the idle speed control system of the engine in such a manner as to increase the fuel-air mixture supplied to the engine in anticipation of the fact that field current will be increased due to the application of the large electrical load.

It accordingly is an object of this invention to provide a load response control method and apparatus for an engine driven alternating current generator that minimizes the impact of large electrical load applications on engine idle quality by controlling the rate of change of alternator field current and providing anticipatory load information to the idle speed control system for the engine.

Another object of this invention is to provide a load response control system of the type that has been described that is switched into operation when engine speed is in an idle range and which is not utilized when engine speed is above a predetermined value that is higher than the idle speed range. Thus, at engine speeds above the predetermined engine speed the voltage regulator of the system operates in a normal conventional manner and the idle speed control system is no longer controlled by the load response system.

Still another object of this invention is to provide a load response control for an engine driven alternator that has a stall-save feature. Thus, in the event that the engine suddenly slows down while it is operating in its idle speed range the field current of the alternator is reduced to a minimum value thereby reducing the torque load imposed on the engine by the generator to prevent the engine from stalling.

Figure 1:
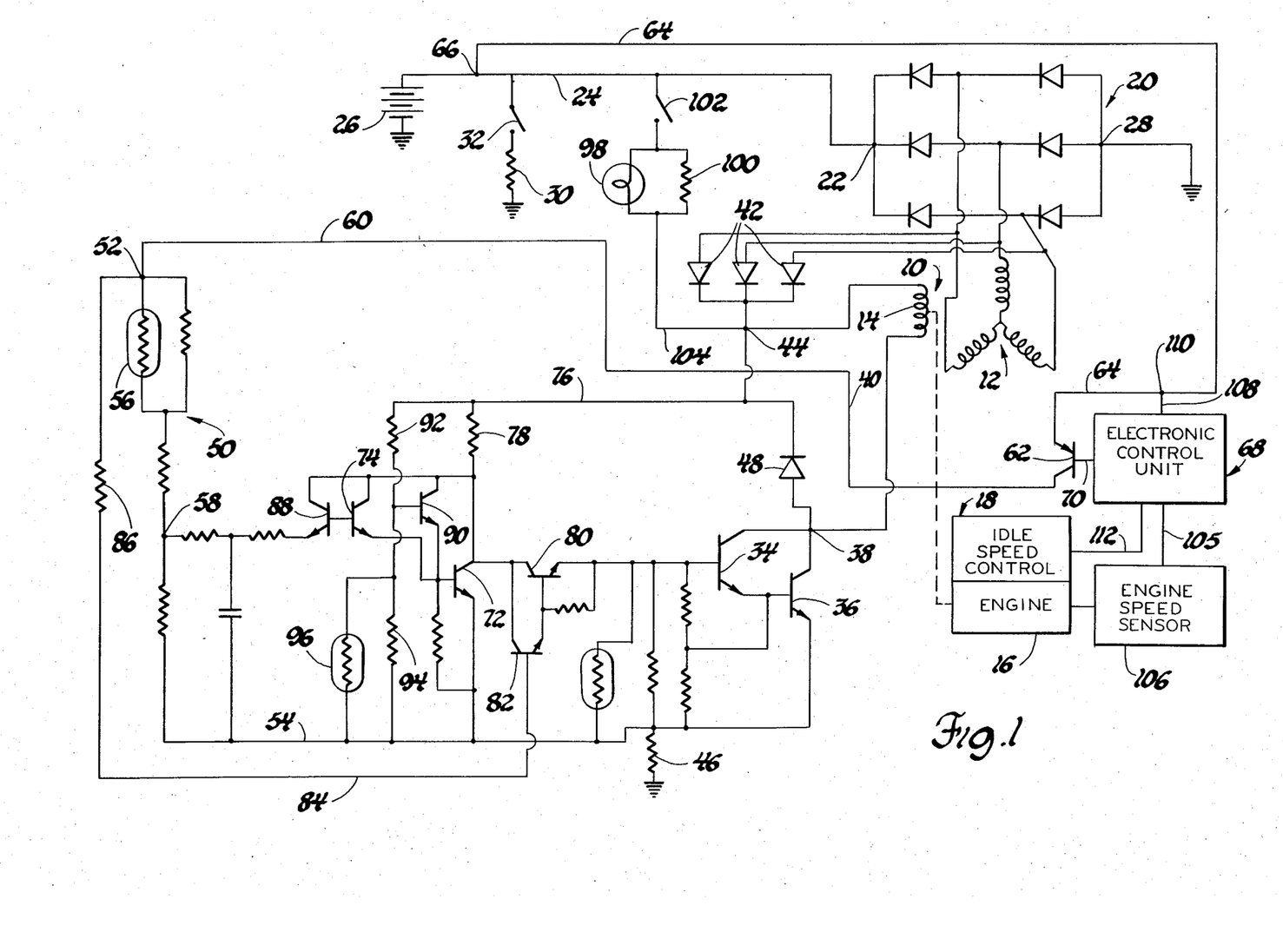
FIG. 1 is a schematic circuit diagram of an alternator load control system made in accordance with this invention.

Referring now to the drawings, and more particularly to FIG. 1, the reference numeral 10 generally designates an alternating current generator that has a three-phase Y-connected output winding 12 and a field winding 14. The field winding 14 is carried by the rotor of the generator 10 in a conventional manner and is driven by a motor vehicle engine 16 via suitable pulleys and a generator drive belt which are represented by a dotted line in FIG. 1. The idle speed of engine 16 is controlled by an engine idle speed control 18 shown as a block in FIG. 1 and in detail in FIG. 2.

The output winding 12 of the generator 10 is connected to a three-phase full-wave bridge rectifier generally designated by reference numeral 20. The positive output terminal 22 of bridge rectifier 20 is connected to a conductor 24 which in turn is connected to the positive side of the motor vehicle battery 26. The negative output terminal 28 of the bridge rectifier 20 is grounded as is the negative side of battery 26. The reference numeral 30 designates an electrical load on the motor which is energized whenever the switch 32 is closed. There are, of course, a plurality of switches that feed various electrical loads on the motor vehicle, which have not been illustrated.

The voltage applied between conductor 24 and ground by bridge rectifier 20 is regulated to a desired regulated value, for example 14 volts in a 12 volt system, by a transistor voltage regulator of the type disclosed in the above-referenced Kirk et al. U.S. Pat. No. 4,459,489 and in the U.S. Pat. to Harland et al. No. 3,597,654. This voltage regulator includes NPN transistors 34 and 36 connected in a Darlington configuration. The collectors of these transistors are connected to a junction 38 which in turn is connected to one side of field winding 14 by conductor 40.

The field winding 14 is energized via a diode trio comprised of three diodes 42. These diodes, together with three diodes of bridge rectifier 20, serve to develop a direct field energizing voltage between junction 44 and ground. Thus, when transistors 34 and 36 are conducting, the field winding 14 is energized via a circuit that can be traced from junction 44 through field winding 14, through conductor 40, through the collector-emitter paths of transistors 34 and 36 and then through a small resistor 46 of approximately 0.02 ohms which is connected to ground. A field discharge diode 48 is connected across the field winding 14.

The voltage regulator has a voltage divider 50 that is connected between junction 52 and conductor 54. The voltage divider 50 is comprised of a plurality of resistors and a thermistor 56. The voltage divider 50 has a junction 58 that develops a divided down representation of the voltage between junction 52 and conductor 54. The conductor 54 is substantially at ground potential, being connected thereto via previously mentioned small resistor 46, so that the voltage at voltage divider junction 58 represents the voltage between junction 52 and ground.

The junction 52 is connected to a conductor 60 which in turn is connected to the collector of a PNP transistor 62. The emitter of transistor 62 is connected to a conductor 64 and this conductor is connected to a junction 66 located near the positive terminal of battery 26. The base of transistor 62 is connected to an electronic control unit 68 by a conductor 70. When transistor 62 is biased fully conductive, the voltage divider 50 of the voltage regulator is connected between junction 66 and ground so that it senses battery voltage and therefore the direct charging voltage applied to the battery 26 by the output terminals of the bridge rectifier 20.

As will be more fully described hereinafter, the transistor 62 is switched on and off to cause a pulse-width modulation of the field voltage applied to the field winding 14 when engine speed is below a predetermined speed, for example 800 rpm. This pulse-width modulated control of transistor 62 is provided by the electronic control unit 68 which causes the bias voltage for transistor 62 on conductor 70 to vary in a manner to be described. When engine speed is above the predetermined speed of 800 rpm, the transistor 62 is biased continuously conductive and the voltage regulator then operates in a conventional fashion.

The switching of the Darlington connected transistors 34 and 36 is controlled by a driver transistor switching stage comprised of Darlington connected transistors 72 and 74. The collectors of these transistors are connected to a conductor 76 via a resistor 78 and conductor 76 is connected to junction 44. The collectors of transistors 72 and 74 are connected to the base of transistor 34 via Darlington connected transistors 80 and 82. When transistors 80 and 82 are conductive, the collector voltage of transistor 72 is applied to the base of transistor 34 and when Darlington connected transistors 80 and 82 are nonconductive, there is no base drive to transistors 34 and 36 with the result that they remain nonconductive to block field current. The base of transistor 82 is connected to conductor 84 which in turn is connected to junction 52 via resistor 86. It will be appreciated, from the foregoing, that if transistor 62 is nonconductive it removes base drive from transistors 34 and 36 since the nonconduction of transistor 62 opens the base circuit to transistor 82 biasing this transistor and transistor 80 nonconductive. Putting it another way, when transistor 62 is biased nonconductive there is no voltage applied to junction 52 nor to the base of transistor 82 and accordingly transistors 82 and 80 are nonconductive in their collector-emitter circuits.

Assuming that transistors 80 and 82 are biased conductive, the driver transistors 74 and 72 will switch on and off, in accordance with the voltage sensed by voltage divider 50, to cause Darlington connected transistors 34 and 36 to switch on and off. Thus, when transistor 72 conducts, it biases transistors 34 and 36 nonconductive and when transistor 72 is nonconductive, it biases transistors 34 and 36 conductive. The emitter-base junction of NPN transistor 88 forms a Zener diode connected to the base of transistor 74. The emitter of transistor 88 is connected to junction 58 on voltage divider 50 via two series connected resistors.

When the voltage sensed by voltage divider 50, which is the voltage between junction 66 and ground, exceeds a predetermined desired regulated value, for example 14 volts in a 12 volt system, the divided down voltage at junction 58 will be high enough to cause the Zener diode comprised of the emitter-base junction of transistor 82 to breakdown and conduct thereby biasing transistors 74 and 72 conductive. This biases transistors 34 and 36 nonconductive to cutoff field current. When the voltage sensed by the voltage divider now drops below the desired regulated value, the voltage at junction 58 drops to a value that causes the transistors 74 and 72 to be biased nonconductive which in turn causes transistors 34 and 36 to be biased conductive. The voltage regulator therefore causes transistors 34 and 36 to switch on and off to control the field current supplied to field winding 14 to a value which operates to maintain the voltage between junction 66 and ground at the desired regulated value.

The transistor 90, resistors 92 and 94 and thermistor 96 provide an over-voltage protection circuit of the type disclosed in the above-mentioned U.S. Pat. to Harland et al. No. 3,597,654. The over-voltage protection circuit is connected to conductor 76 which senses the voltage appearing between junction 44 and ground and therefore diode trio voltage.

The system of FIG. 1 includes a signal lamp 98 connected in parallel with a resistor 100. The parallel connected signal lamp and resistor are connected in series with an ignition switch 102 and with conductor 104 that is connected to junction 44. The circuitry that has just been described provides for initial excitation of the field winding 14 from the battery and for an indication of low voltage output of the system in a manner well known to those skilled in the art.

Figure 3:
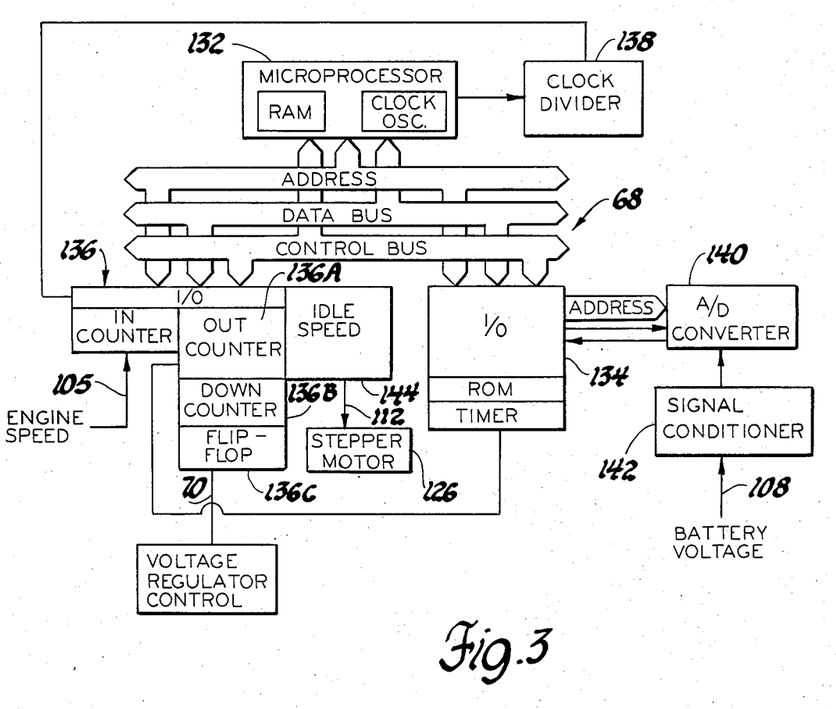
FIG. 3 illustrates a digital computer that forms a part of the system illustrated in FIG. 1.

The electronic control unit 68 takes the form of a digital computer, which is illustrated in FIG. 3. The control unit 68 receives engine speed information on line 105 that takes the form of a series of pulses, the frequency of which are a function of the speed of engine 16. The pulses on line 105 are provided by an engine speed sensor 106 that is driven by engine 16. Engine speed sensors are well known to those skilled in the art and the speed sensor 106 may comprise a magnetic pickup that has a rotor that is driven by engine 16 and a pickup coil, the output of which is squared by a conventional squaring circuit. The speed sensor 106 may also be of the well known optical type. In any event, the control unit is supplied with an engine speed signal on line 105.

The control unit 68 is also supplied with the voltage appearing between junction 66 and ground or, in other words, the voltage across battery 26. This battery voltage is applied to control unit 68 by a conductor 108 that is connected to junction 110 and by a ground connection, which has not been illustrated. The junction 110 is connected to junction 66 by conductor 64 and accordingly the voltage at junction 66 is applied to control unit 68.

The electronic control unit 68 has an output on line 70 that develops a control voltage which is applied to the base of the transistor 62 to bias transistor 62 either conductive or nonconductive. The control unit 68 also has an output on line 112 that controls the idle speed control 18. The idle speed control 18 is illustrated in detail in FIG. 2 and is of the type disclosed in the U.S. Pat. to Bock No. 4,393,319.

Figure 2:
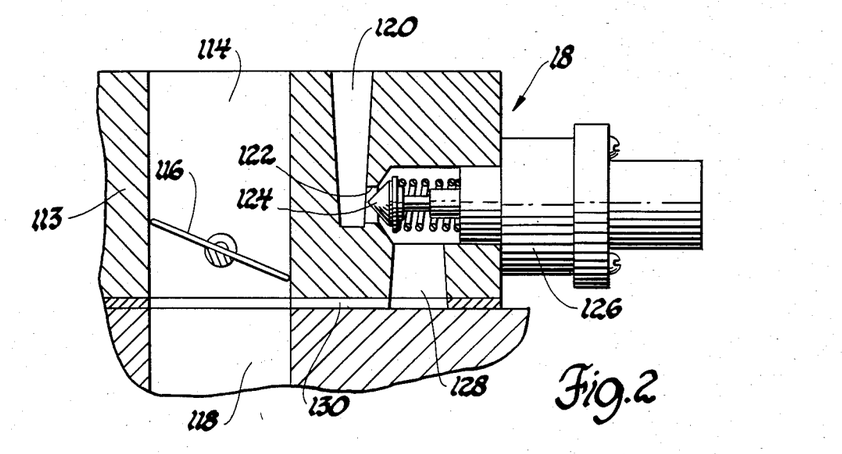
FIG. 2 is a view partly in section of an idle air bypass control for controlling the idle speed of an internal combustion engine.

Referring now to FIG. 2, the idle speed control 18 comprises a housing 113 that has a bore 114 controlled by a throttle valve 116. The upper end of bore 114 communicates with atmosphere while the lower end 118 communicates with the intake manifold of engine 16. The bore 114 is supplied with fuel, for example by a fuel injector disposed above throttle valve 116 which is not illustrated. The housing 113 further has a passage 120 that communicates with atmosphere and this passage terminates in a valve seat 122. The valve seat 122 cooperates with a valve plunger or valve 124 which is shiftable toward and away from the valve seat 122 by an electric stepper motor 126. It can be seen that when the valve 124 moves away from the valve seat 122 the passages 120 and 128 are connected. The passage 128 is connected to passage 130 which communicates with bore or passage 118. The valve 124 therefore controls air bypass around throttle plate 116.

The stepper motor 126 is shown in detail in the above-referenced Bock U.S. Pat. No. 4,393,319. As shown in that patent, the rotor of the stepper motor has a threaded connection with a shaft that carries the valve 124 so that rotation of the rotor causes axial movement of valve 124. The stepper motor is operated by a series of digital pulses and each pulse that is applied to the stepper motor causes the rotor to rotate through a predetermined arc with a consequent corresponding predetermined axial movement of valve 124. The stepper motor is bidirectional so that when the rotor rotates in one direction valve 124 is moved toward seat 122 and when the rotor rotates in an opposite direction the valve 124 moves away from seat 122.

As the valve 124 moves away from valve seat 122 more air bypasses throttle plate 116 and the amount of fuel injected is increased commensurate with the increase in air supplied to the engine in a known manner. Accordingly, the amount of fuel-air mixture supplied to the engine is increased to thereby tend to increase the speed of the engine. When the valve 124 moves toward valve seat 122 the amount of fuel-air mixture supplied to the engine is decreased.

Referring now to FIG. 3, the electronic control unit or digital computer 68 will be described. This digital computer is of the type disclosed in the U.S. Pat. to Kastura et al. No. 4,271,402 and includes a microprocessor 132 containing a RAM and a clock oscillator. The system includes address, data and control busses, as shown in FIG. 3, and a combination module 134 that includes an input/output unit, a ROM and a timer. The ROM section of module 134 stores an operating program for the digital system. The digital system further has an input/output interface circuit 136 coupled to a clock divider 138, as shown. In addition, the system includes an analog to digital converter 140 and a signal conditioner 142. The interface circuit 136 has an input counter, labeled as such, which has engine speed as an input on line 105. The interface circuit 136 further has an output counter 136A, a down counter 136B and a flip flop 136C. The output counter 136A, as will be more fully described hereinafter, forms a counter or register which accumulates a count magnitude or binary number that is representative of the desired duty cycle or on time of transistor 62. The count magnitude that is contained in output counter 136A is periodically loaded into down counter 136B where it is counted down at a predetermined constant rate. The flip-flop 136C is set to a certain state when the down counter 136B is loaded and the down counter is then counted down. When the down counter has been completely counted down the flip-flop 136C is operated to an opposite state. The flip-flop 136C is connected to the output conductor 70 of the electronic control unit 68 and the voltage on conductor 70 (high or low) determines whether or not the transistor 62 will be biased conductive or nonconductive. The system shown in FIG. 3 generates consecutive occurring basic timing periods of equal time duration at a constant frequency. At the beginning of a time period the system operates to bias transistor 62 conductive and the transistor remains conductive until the down counter 136B has counted down to zero. The time period that transistor 62 is biased conductive corresponds to a certain percentage of a basic timing period and hence is termed the percent duty cycle or duty cycle. Thus, the time that transistor 62 is biased conductive corresponds to a certain portion or percentage of consecutively occurring fixed time periods that are generated by the system of FIG. 3. The loading of down counter 136B and its counting down to zero provide a variable pulse-width duty cycle modulator. The pulse-width or percent duty cycle is determined by the magnitude of the count in counter 136A at the time the system outputs the duty cycle. The system therefore provides a constant frequency variable pulse-width control of the duty cycle or on time of transistor 62.

The system of FIG. 3 has battery voltage applied thereto via conductor 108. The analog voltage on conductor 108 is converted to a digital signal by the analog to digital converter 140 which applies this digital signal to the module unit 134. The system of FIG. 3 therefore receives a digital signal, the magnitude of which is a function of battery voltage or, in other words, a function of the voltage appearing between junction 66 and ground of FIG. 1.

The digital computer of FIG. 3 has a block 144 which is entitled idle speed. The idle speed block 144 represents an idle speed control system of the type that is disclosed in the U.S. Pat. to Carlson et al. No. 4,337,742. This idle speed control system 144 has an output on line 112 which controls the stepper motor 126. Thus, the signal on line 112 will cause the stepper motor 126 to rotate in one direction or the other in order to adjust the position of the valve 124 relative to the valve seat 122. As will be more fully described hereinafter, the system of this invention will cause the valve 124 to be axially translated in one direction or the other, depending upon whether or not battery voltage is above or below a desired regulated value. The idle speed control system 144 operates closed loop on engine speed of, for example, 800 rpm but it also provides for open loop control of valve 124 in a manner to be discribed.

The digital computer, illustrated in FIG. 3, is programmed to repeatedly execute the program or control algorithm illustrated in FIG. 4, which will now be described. Assuming that the engine 16 has been started and is running, the digital system, as indicated by decision point 150, determines whether or not engine speed is within the idle speed range. Thus, as previously mentioned, the control system of FIG. 3 receives engine speed information on line 105. By way of example, it will be assumed that the decision block 150 determines whether or not engine speed is above or below 800 rpm. If engine speed is above 800 rpm, the system proceeds to step 151 which causes the system to be set for a maximum duty cycle of substantially 100% for transistor 62. This is accomplished by loading the counter 136A (FIG. 3) with a count magnitude that corresponds substantially to 100% duty cycle. The program now proceeds to step 154 which causes a duty cycle to be outputted to transistor 62. The step 154 corresponds to the loading of down counter 136B from counter 136A and its subsequent counting down to zero. The transistor 62, of FIG. 1, is now biased substantially continuously conductive so that the voltage regulator now operates in a conventional fashion, that is transistors 34 and 36 are biased nonconductive as long as the voltage applied across battery 26 is above the desired regulated value and are biased conductive when the voltage applied to battery 26 is below the desired regulated value. Thus, while engine speed is above 800 rpm, the system operates in a conventional fashion.

If the speed of the engine was in the idle speed range, that is below 800 rpm, the decision block 150 would indicate this and the program would proceed to decision block 156. The decision block 156 is a stall-save decision point and it determines whether or not engine speed has dropped to some low predetermined value that would indicate that the engine is about to stall. If such a low speed condition exists the program proceeds to step 158 which causes the output duty cycle of transistor 62 to be set at a minimum value which tends to reduce, as far as possible, the torque load imposed on the engine by the generator. This is accomplished by loading counter 136A with a count magnitude that corresponds to a minimum duty cycle for transistor 62. Thus, the stall-save decision block 156 and step 158 operate to reduce the loading of the generator 10 in the event that the engine speed is slowing down toward a condition to where it might stall.

If the decision in the stall-save decision point 156 is no, that is that engine speed is high enough to not require the minimum duty cycle provided by step 158, the computer program proceeds to step 160. In step 160, the voltage applied to the battery, that is the voltage between junction 66 and ground, is read. In this regard, the magnitude of the battery voltage is applied to the digital computer by conductor 108, signal conditioner 142, and analog to digital converter 140.

After reading the magnitude of the battery voltage the program proceeds to decision point 162. In decision point 162 the system determines whether or not the battery voltage is above a set point voltage. This set point voltage corresponds to the desired regulated voltage that is to be maintained between junction 66 and ground. It will be assumed, in the further discussion of FIG. 4, that the set point voltage is 14 volts. Assuming that battery voltage is lower than the set point voltage, the program proceeds to decision point 164 which determines whether or not battery voltage is less than the set point voltage. If it is assumed that battery voltage is less than set point voltage the program proceeds to step 166. In step 166 a count in a digital ramp counter, which forms a part of the digital system illustrated in FIG. 3, is incremented or has its count increased at a constant rate. This ramp counter has not been illustrated in FIG. 3 but can take the form of a usual counter or register which, during step 166, has its count increased at a constant rate during the time that battery voltage is less than the set point voltage. Following step 166 the program proceeds to decision block 168 wherein it is determined whether or not the system is ready to increment the duty cycle. Assuming the answer to be yes, the program proceeds to step 170 in which the duty cycle is incremented. The amount that the duty cycle is incremented is determined by the magnitude of the count in the ramp counter and during step 170 the counter 136A, of interface circuit 136, is loaded with a binary number that corresponds to the count that was attained in the ramp counter.

After the duty cycle has been incremented during step 170 the program proceeds to decision block 172 wherein it is determined whether or not the idle speed control is ready to increment the idle speed control system by one air control position. The term one air control position means that the digital signal applied to the stepper motor 126 will cause the stepper motor to rotate through a predetermined arc to thereby cause the valve 124 to move away from the valve seat 122 to thereby increase the fuel-air mixture that is supplied to the engine. At step 174 in the program the idle speed control does cause the stepper motor 126 to move the valve 124 away from valve seat 122 by one air control position to thereby supply an increased fuel-air mixture to the engine. Following step 174 the program proceeds to step 154 in which an output duty cycle signal is applied to transistor 62 which corresponds to the count in the counter 136A. Thus, during step 154 the count in the counter 136A is loaded into the down counter 136B and this count is then counted down to zero to thereby control the duty cycle of transistor 62.

Assuming now that when decision point 162 was reached, the battery voltage was greater than the reference voltage, the program would have proceeded to step 176 wherein the count in the previously mentioned ramp counter would have been reduced or decremented. The program would now proceed to decision block 178 which determines whether the system is ready to decrement the duty cycle. Assuming that the answer is yes, the program proceeds to step 180 in which the duty cycle is decremented. In the mode of operation that has just been described, the count in the ramp counter has been reduced and its count, during step 180, is loaded into the counter 136A. Following step 180, the program proceeds to decision point 182 which determines whether or not the system is ready to decrement the idle speed control by one air control position. Assuming the answer to be yes, the program proceeds to step 184 wherein the idle speed control is decremented by one air control position. This, of course, means that the stepper motor is now operated through a predetermined arc of rotation and in such a direction as to cause the valve 124 to move toward the valve seat 122 to thereby reduce the fuel-air mixture supplied to the engine. Following step 184 the system outputs a duty cycle to control the on time or duty cycle of transistor 62. During step 154 the magnitude of the count in counter 136A is transferred to the down counter 136B and then counted down in a manner that has been described.

It should be pointed out that the system of this invention anticipates a change in field current and operates the idle speed control system just prior to the time that field current is changed. Thus it will be evident, from FIG. 4, that step 174 or 184 both occur prior to the time (step 154) that the system outputs a duty cycle signal to transistor 62. This means that in the case where battery voltage is lower than the set point voltage the field current can be expected to increase to thereby increase the loading of the engine. The system of this invention anticipates this expected increase in engine loading and adjusts the idle speed control system in such a direction as to compensate for the expected increased load. Thus, the fuel-air mixture to the engine is increased just prior to the time that the generator increases the load on the engine with the result that engine speed sag is substantially reduced. On the other hand, when battery voltage is higher than the set point voltage, the system, in anticipation of reduced field current and therefore reduced engine loading, causes the idle speed control system to decrease the fuel-air mixture to the engine just prior to the time that field current is reduced.

It has been pointed out that the count of the ramp counter is increased at a constant rate when battery voltage is below the desired regulated value and is decreased at a constant rate when battery voltage is above the desired regulated value. The duty cycle or on time of transistor 62 will be related to the magnitude of the count that is in the ramp counter at the time that counter 136A is loaded from the ramp counter. The net count in the ramp counter, at any given time, will depend on the past history of the relative magnitudes of battery voltage and set point or desired regulated voltage. Thus, as long as battery voltage is below the desired regulated value the ramp counter has its count increased (step 166, FIG. 4) at a constant rate during each cycle of operation of digital computer 68. When battery voltage eventually goes higher than the desired regulated value the magnitude of the count that was attained in the ramp counter, during the time that battery voltage is below the desired regulated value, is now decreased at a constant rate (step 176, FIG. 4) during each cycle of operation of the digital computer 68.

At the expense of some reiteration it should be pointed out that regardless of the magnitude of the voltage applied to battery 26, the field controlling transistors 34 and 36 will always be biased nonconductive to cutoff field current whenever transistor 62 is nonconductive. Further, during any time period that transistor 62 is conductive the conductive or nonconductive state of field controlling transistors 34 and 36 will depend on whether or not the voltage that is applied to battery 26 and to voltage divider 50 of the voltage regulator is above or below the desired regulated value.

The voltage regulator and the electronic control unit switch their control states at the same desired regulated voltage magnitude. Thus, if the desired regulated value is, for example 14 volts, the voltage at junction 58 of the voltage regulator will be of such a magnitude as to cause transistors 34 and 36 to be biased conductive when the voltage applied to the battery is below 14 volts and the ramp counter will have its count increased (step 166, FIG. 4) when the voltage applied to the battery is below the 14 volt value. If the voltage applied to the battery is above the assumed desired regulated value of 14 volts the voltage at junction 58 of the voltage regulator will be such as to cause transistors 34 and 36 to be biased nonconductive and the ramp counter will have its count reduced (step 176, FIG. 4).

As long as the voltage applied to the battery is below the desired regulated value the ramp counter will count up during each cycle of the digital computer and the count accumulated by the ramp counter will continue to increase. This will cause consecutive occurring duty cycles of transistor 62 to progressively increase. This causes the duty cycle of the field voltage pulses to progressively increase to thereby provide field current pulses that progressively increase. With increasing field current the output voltage of the generator will increase and eventually the voltage applied to the battery will exceed the desired regulated value of 14 volts whereupon field controlling transistors 34 and 36 will be biased nonconductive.

The following summarizes the operation of the system of this invention.

1. When engine speed is above an idle speed, for example 800 rpm, the voltage regulator operates in a normal conventional fashion since transistor 62 is biased continuously conductive. The system now operates to control the switching of transistors 34 and 36 by the conduction and nonconduction of the Zener diode 88.
2. If battery voltage is lower than the set point voltage or, in other words, lower than the desired regulated value and engine speed is below 800 rpm the system operates to progressively increase the duty cycle or on time of transistor 62 to thereby cause generator output voltage to increase. During this mode of operation, the idle speed control is progressively incremented to progressively increase the fuel-air mixture supplied to the engine.
3. When battery voltage is above the set point voltage and engine speed is below 800 rpm the ramp counter (step 176, FIG. 4) is reduced which causes the duty cycle of transistor 62 to be progressively decreased. The voltage at junction 58 of the voltage regulator biases transistors 34 and 36 nonconductive and the idle speed control is progressively decremented to progressively decrease the fuel-air mixture supplied to the engine.

As has been mentioned, when the engine is operating in an idle speed range and where a large electrical load is applied to the generator the conventional voltage regulator would tend to continuously apply full field voltage to the field winding of the generator with the result that the engine is suddenly loaded to slow it down. This, of course, adversely effects the idle speed quality of the idle speed of the engine. Thus, with a conventional voltage regulator the engine may actually stall and in any event, engine speed suddenly sags. With the system of this invention the switching on of a large electrical load, instead of causing full field voltage to be continuously applied, causes field voltage to be progressively increased to thereby progressively increase the torque load on the engine. In addition, the system of this invention anticipates the increased engine loading and controls the idle speed control system to increase the amount of fuel-air mixture supplied to the engine in anticipation of increased field current. The type of electrical loads that may cause a large drop in generator output voltage are the engine cooling fan, the backlight heater for the rear window, the switching on of high beam headlamps and high blower speed for the heating and air conditioning system.

When the idle speed control system increments or decrememnts the air control position of valve 124 (steps 174 or 184) it is operating in an open loop mode. Moreover, the incrementing or decrementing of the air control position will always occur prior to the time that a duty cycle is outputted for transistor 62 so that the amount of fuel-mixture supplied to the engine is varied prior to the time that the pulse width or on time of transistor 62 is varied. Thus, during each cycle of operation of the digital computer the position of valve 124 is adjusted just prior to the time that transistor is biased conductive for a computed duty cycle. When battery voltage is below the set point voltage the position of valve 124 is moved by a predetermined amount (one air control position) away from valve seat 22 during each cycle of operation of the digital computer and each variation of air control position is followed by an increase in pulse-width or duty cycle of transistor 62. The variation in air control position and duty cycle of transistor 62 therefore operate in unison and at the timing frequency of the digital computer.

Figure 4:
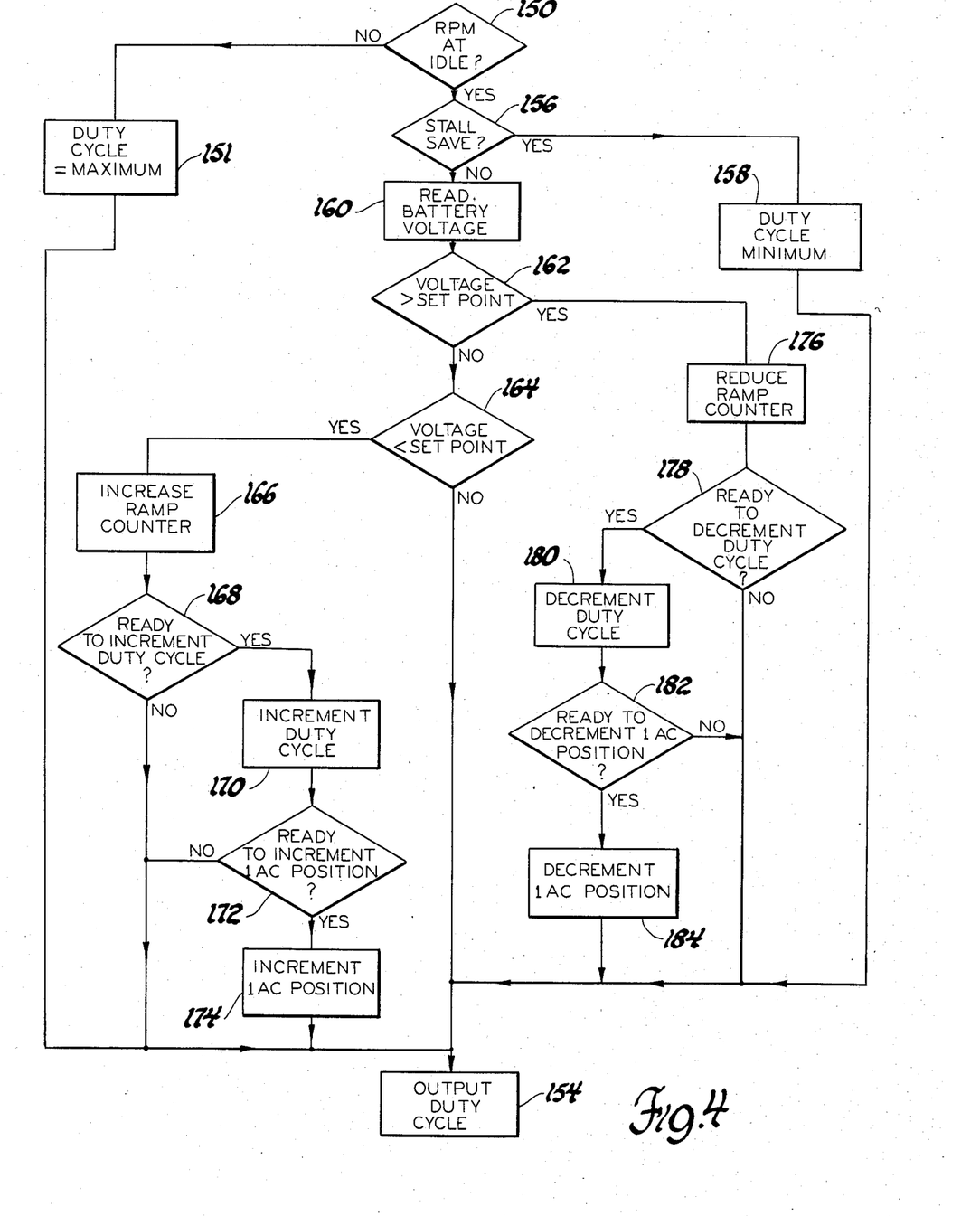
FIG. 4 is a diagram illustrating the control algorithm of the load control system of this invention and the steps that are executed by the digital computer shown in FIGS. 1 and 3.

The control algorithm shown in FIG. 4 may be modified so as to eliminate or delete decision point 182 and step 184. With such an arrangement, step 154 would immediately follow step 180. With such a modification the idle speed control system is only operated open loop when battery voltage is below the set point voltage and it is only incremented. In such a modification the duty cycle of transistor 62 would be decremented when battery voltage is above the set point voltage due to step 180 of FIG. 4.

The digital computer 68, as has been described, performs the idle speed control function and controls the duty cycle of transistor 62 to thereby control the duty cycle of energization of field winding 14.

The embodiments of the invention in which an exclusive property or privilege is claimed are defined as follows:

1. The method of controlling the field current of an alternating current generator that has an output winding and a field winding wherein the output winding feeds the electrical loads on a motor vehicle and wherein the generator is driven by the engine of the vehicle and for controlling the amount of fuel-air mixture supplied to the engine, the steps comprising, determining whether engine speed is above or below a predetermined value, when engine speed is above said predetermined value continuously energizing said field winding for a time period that corresponds to the time that the output voltage of said output winding is below a desired regulated value and maintaining said field winding deenergized for a time period that corresponds to the time that output voltage of the output winding is above the desired regulated value, when engine speed is below said predetermined value causing said field winding to be alternately energized and deenergized when the output voltage of the output winding is below said desired regulated value and such that the time periods of field energization progressively increase, and while said engine speed is below said predetermined value increasing the fuel-air mixture supplied to the engine each time a time period of field energization increases.

2. The method of controlling the field current of an alternating current generator that supplies the electrical loads on a motor vehicle and for affecting the amount of fuel-air mixture supplied to the motor vehicle engine that drives the generator, the steps comprising, sensing the magnitude of the output voltage of the generator, sensing the speed of the engine, when the speed of the engine is below a predetermined speed and the output voltage of the generator is below a desired regulated value periodically incrementing the amount of fuel-air mixture supplied to the engine at a predetermined frequency, and energizing and deenergizing said field winding, the time that said field winding begins to be energized being controlled such that field energization begins after the incrementing of said fuel-air mixture, the time periods of field energization occurring at said predetermined frequency and progressively increasing when the output voltage of the generator is below said desired regulated value.

3. A load control system for controlling the field current of an alternating current generator that feeds the electrical loads on a motor vehicle and for affecting the operation of the idle speed control system for the motor vehicle engine that drives the generator comprising, an engine, an alternating current generator having an output winding and a field winding, said generator being coupled to said engine so as to be driven thereby, a voltage regulator connected to sense the output voltage of said output winding and including a semiconductor switch connected in series with said field winding, said voltage regulator when operating in a first mode of operation causing said semiconductor switch to be biased conductive when said output voltage is below a desired regulated value and maintaining said semiconductor switch nonconductive when said output voltage is above said desired regulated value, load control means coupled to said voltage regulator for at times causing said voltage regulator to operate in a second mode of operation, said voltage regulator when operating in said second mode of operation causing said semiconductor switch to be operated such that it is biased alternately conductive and nonconductive with the consecutive occurring time periods that the semiconductor switch is biased conductive progressively increasing when said output voltage is below said desired regulated value, means for developing a speed signal that is a function of engine speed, means responsive to said speed signal for causing said voltage regulator to operate in said first mode of operation when engine speed is above a predetermined value and in said second mode of operation when engine speed is below said predetermined value, idle speed control means coupled to said engine including means for varying the amount of fuel-air mixture supplied to said engine, and means coupled to said idle speed control means operative when said voltage regulator is operating in said second mode of operation for causing the amount of fuel-air mixture supplied to said engine to be increased each time that the time period of conduction of said semiconductor switch increases.

4. A load control system for controlling the field current of an alternating current generator that feeds the electrical loads on a motor vehicle wherein the generator is driven by the motor vehicle engine comprising, an engine, an alternating current generator having an output winding and a field winding, said generator being coupled to said engine so as to be driven thereby, a voltage regulator connected to sense the output voltage of said output winding and including a semiconductor switch connected in series with said field winding, said voltage regulator when operating in a first mode of operation causing said semiconductor switch to be biased conductive when said output voltage is below a desired regulated value and maintaining said semiconductor switch nonconductive when said output voltage is above said desired regulated value, load control means coupled to said voltage regulator for at times causing said voltage regulator to operate in a second stall-save mode of operation, said voltage regulator when operating in said second stall-save mode of operation causing said semiconductor switch to be operated such that it is biased alternately conductive and nonconductive with the consecutive occurring time periods that the semiconductor switch is biased conductive having a minimum time period when said output voltage is below said desired regulated value, means for developing a speed signal that is a function of engine speed, means responsive to said speed signal for causing said voltage regulator to operate in said first mode of operation when engine speed is above a first predetermined value and in said second stall-save mode of operation when engine speed is below said first predetermined value and is below a second predetermined value that is less than said first predetermined value, the said minimum time period of conduction of said semiconductor switch being such as to reduce the load imposed on the engine by the generator to thereby prevent engine stall.

5. A load control system for controlling the field current of an alternating current generator that feeds the electrical loads on a motor vehicle and for affecting the operation of the idle speed control system for the motor vehicle engine that drives the generator comprising, an engine, an alternating current generator having an output winding and a field winding, said generator being coupled to said engine so as to be driven thereby, a voltage regulator connected to sense the output voltage of said output winding and including a semiconductor switch connected in series with said field winding, said voltage regulator when operating in a first mode of operation causing said semiconductor switch to be biased continuously conductive as long as said output voltage is below a desired regulated value and maintaining said semiconductor switch continuously nonconductive when said output voltage is above said desired regulated value, load control means coupled to said voltage regulator for at times causing said voltage regulator to operate in a second mode of operation, said voltage regulator when operating in said second mode of operation causing said semiconductor switch to be operated such that it is biased alternately conductive and nonconductive with the consecutive occurring time periods that the semiconductor switch is biased conductive progressively increasing when said output voltage is below said desired regulated value, means for developing a speed signal that is a function of engine speed, means responsive to said speed signal for causing said voltage regulator to operate in said first mode of operation when engine speed is above a predetermined value and in said second mode of operation when engine speed is below said predetermined value, idle speed control means coupled to said engine including means for varying the amount of fuel-air mixture supplied to said engine, and means coupled to said idle speed control means operative when said voltage regulator is operating in said second mode of operation for causing the amount of fuel-air mixture supplied to said engine to be incremented each time that the time period of conduction of said semiconductor switch increases, the beginning of the incrementing of said fuel-air mixture and the start of a conduction period of said semiconductor switch being so synchronized that the time that said fuel-air mixture starts to be incremented occurs prior to the time that a conduction period of semiconductor switch begins.

6. A load control system for controlling the field current of an alternating current generator that feeds the electrical loads on a motor vehicle and for affecting the operation of the idle speed control system for the motor vehicle engine that drives the generator comprising, an engine, an alternating current generator having an output winding and a field winding, said generator being coupled to said engine so as to be driven thereby, a voltage regulator connected to sense the output voltage of said output winding and including a semiconductor switch connected in series with said field winding, said voltage regulator when operating in a first mode of operation causing said semiconductor switch to be biased conductive when said output voltage is below a desired regulated value and biasing said semiconductor switch nonconductive when said output voltage is above said desired regulated value, load control means coupled to said voltage regulator for at times causing said voltage regulator to operate in a second mode of operation, said voltage regulator when operating in said second mode of operation causing said semiconductor switch to be operated such that it is biased alternately conductive and nonconductive with the duty cycle that the semiconductor switch is biased conductive being variable and controlled, said load control means including digital counter means and means connected to said output winding to sense said output voltage, said counter means being incremented when said output voltage is below a desired regulated value and decremented when said output voltage is above said desired regulated value, means for setting said duty cycle at a value that is a function of magnitude of the count in said counter means, means for developing a speed signal that is a function of engine speed, means responsive to said speed signal for causing said voltage regulator to operate in said first mode of operation when engine speed is above a predetermined value and in said second mode of operation when engine speed is below said predetermined value, idle speed control means coupled to said engine including means for varying the amount of fuel-air mixture supplied to said engine, and means coupled to said idle speed control means operative when said voltage regulator is operating in said second mode of operation for causing the amount of fuel-air mixture supplied to said engine to be increased each time that a duty cycle of conduction of said semiconductor switch occurs and is increasing.

7. A load control system for controlling the field current of an alternating current generator that feeds the electrical loads on a motor vehicle and for affecting the operation of the idle speed control system for the motor vehicle engine that drives the generator comprising, an engine, an alternating current generator having an output winding and a field winding, said generator being coupled to said engine so as to be driven thereby, a voltage regulator connected to sense the output voltage of said output winding and including a semiconductor switch connected in series with said field winding, said voltage regulator when operating in a first mode of operation causing said semiconductor switch to be biased conductive when said output voltage is below a desired regulated value and biasing said semiconductor switch nonconductive when said output voltage is above said desired regulated value, load control means coupled to said voltage regulator for at times causing said voltage regulator to operate in a second mode of operation, said voltage regulator when operating in said second mode of operation causing said semiconductor switch to be operated such that it is biased alternately conductive and nonconductive with the duty cycle that the semiconductor switch is biased conductive being variable and controlled, said load control means including digital counter means and means connected to said output winding to sense said output voltage, said counter means being incremented when said output voltage is below a desired regulated value and decremented when said output voltage is above said desired regulated value, means for setting said duty cycle at a value that is a function of magnitude of the count in said counter means, means for developing a speed signal that is a function of engine speed, means responsive to said speed signal for causing said voltage regulator to operate in said first mode of operation when engine speed is above a predetermined value and in said second mode of operation when engine speed is below said predetermined value, idle speed control means coupled to said engine including means for varying the amount of fuel-air mixture supplied to said engine, and means coupled to said idle speed control means operative when said voltage regulator is operating in said second mode of operation for causing the amount of fuel-air mixture supplied to said engine to be increased each time that a duty cycle of conduction of said semiconductor switch occurs and is increasing, said system being so constructed and arranged that the beginning of the increase in fuel-air mixture occurs prior to the time that the start of a conduction period of said semiconductor switch occurs.

* * * * *